US012692149B2

(12) United States Patent
Szeteli

(10) Patent No.: US 12,692,149 B2
(45) Date of Patent: Jul. 28, 2026

(54) WITHDRAWAL SYSTEM

(71) Applicant: AS Strömungstechnik GmbH, Ostfildern (DE)

(72) Inventor: Andreas Szeteli, Filderstadt (DE)

(73) Assignee: AS Strömungstechnik GmbH, Ostfildern (DE)

( * ) Notice: Subject to any disclaimer, the term of this patent is extended or adjusted under 35 U.S.C. 154(b) by 226 days.

(21) Appl. No.: 18/212,208

(22) Filed: Jun. 21, 2023

(65) Prior Publication Data

US 2024/0034615 A1 Feb. 1, 2024

(30) Foreign Application Priority Data

Jul. 29, 2022 (DE) ......................... 102022119050.1

(51) Int. Cl.
*B67D 7/78* (2010.01)

(52) U.S. Cl.
CPC ...................................... *B67D 7/78* (2013.01)

(58) Field of Classification Search
CPC .. B67D 1/0829; B67D 1/0835; B67D 1/0801; B67D 1/0288; B65D 25/14; B65D 25/16; B65D 11/08; B65D 11/06
USPC ........................................ 220/601; 222/400.7
See application file for complete search history.

(56) References Cited

U.S. PATENT DOCUMENTS 3,454,199 A * 7/1969 Malick ................ B67D 1/0832 222/400.7
3,908,871 A * 9/1975 Gottwald ............. B67D 1/0829 137/212
4,699,298 A * 10/1987 Grant ..................... B67D 7/344 285/914
4,793,491 A * 12/1988 Wolf ...................... B65D 85/84 220/62.19
5,335,821 A * 8/1994 Osgar .................... B65D 85/84 222/105
6,045,000 A * 4/2000 Rauworth .............. B65D 11/06 220/601
6,357,494 B1 * 3/2002 Hahn ...................... B67D 7/344 141/378
7,042,695 B2 * 5/2006 Przytulla .................. B65D 1/12 361/215
7,128,212 B2 * 10/2006 Gargano ............. F16L 55/1108 206/524.4
8,371,469 B2 * 2/2013 Takedutsumi ......... B65D 77/06 220/495.05
10,994,984 B2 * 5/2021 O'Brien ............... B67D 3/0064
11,027,879 B2 * 6/2021 Falvey ................... B65D 25/28
2002/0040740 A1 * 4/2002 Ozawa ................. B67D 1/0835 141/351
2002/0050494 A1 * 5/2002 Rauworth ............ B67D 7/0288 220/601

(Continued)

*Primary Examiner* — Charles P. Cheyney
(74) *Attorney, Agent, or Firm* — Von Rohrscheidt Patents

(57) ABSTRACT

A dispensing system (1) for a container (2) having a dip tube (5), wherein the dip tube (5) is fastened to the inner side of a pipe-shaped lug (6) of the container (2). The dip tube (5) has a removal opening, which can be closed off with a dip tube closure (12). When the dip tube closure (12) is released, a dispense head (4) can be attached to the dip tube (5) for dispensing liquid (3) from the container (2) or for supplying liquid (3) into the container (2), The dip tube (5) has a release safeguard, which abuts the outer side of the pipe-shaped lug (6) with clamping pressure.

15 Claims, 5 Drawing Sheets

(56) References Cited

U.S. PATENT DOCUMENTS

| | | | | |
|---|---|---|---|---|
| 2005/0082076 | A1* | 4/2005 | Przytulla | B65D 1/12 174/50 |
| 2015/0274502 | A1* | 10/2015 | Kuhn | B67D 1/0831 53/476 |
| 2016/0229679 | A1* | 8/2016 | Ware | B67D 7/06 |
| 2018/0222657 | A1* | 8/2018 | Rundin | B65D 25/282 |
| 2019/0217990 | A1* | 7/2019 | Weyrauch | B65D 85/70 |

* cited by examiner

WITHDRAWAL SYSTEM

CROSS REFERENCE TO RELATED APPLICATIONS

This application claims the priority of DE 102022119050.1 filed on 2022 Jul. 29; this application is incorporated by reference herein in its entirety.

BACKGROUND

The invention relates to a dispensing system.

Such a dispensing system is used for filling and draining containers, particularly barrels, filled with liquid chemicals. The dispensing system comprises a dispense head, which can be fastened to a dip tube of a container. By means of the dispense head, via the dip tube, fluid can be dispensed from the container or fluid can be supplied to the container.

The dip tube is typically fixed to the container by a screw connection. The container has a pipe-shaped lug inside which the dip tube is screwed in.

On its top, the dip tube itself has an opening, in which the dispense head can be inserted and, in particular, can be fixed by a screw connection. If the dispense head is no longer required, it is released from the dip tube and a dip tube closure is screwed into the opening of the dip tube, by which the dip tube is sealed, such that the container can be transported.

One problem with this is that when the dip tube closure is screwed into the opening of the dip tube too tightly, the retention force of the dip tube closure in the dip tube is greater than the retention force with which the dip tube is held in the pipe-shaped lug of the container. If the dip tube is then screwed off again to reinstall a dispense head, the dip tube releases out of the pipe-shaped lug and fluid can escape uncontrolled from the container, which can present hazards to persons. Moreover, the dispense head can then no longer be mounted on the container.

Containers of such dispensing systems can contain in particular highly flammable liquids. In this case, it is necessary to dissipate an electrostatic charge of the liquid.

For this purpose, containers of known dispensing systems have a multilayer structure with an outer layer consisting of a dissipation-capable material and an inner layer consisting of an electrically insulating material. In this context, a dissipation-capable material is a material with low electrical conductivity that can dissipate electrostatic charges. The dip tube, which itself consists of dissipation-capable material, is mounted in the container in an electrically insulated manner.

To prevent electrostatic charges of the liquid in the container, additional connection components must be fastened to the top of the dip tube, the connection components ensuring dissipation of electrostatic charges of the liquid in the container via the dip tube to the outer layer of the container, said outer layer consisting of dissipation-capable material, wherein the connection components are connected to the outer layer of the container.

Such additional connection components cause significant additional design work. Moreover, the connection components can be damaged or torn off during a transport of the container.

SUMMARY

The invention relates to a dispensing system (1) for a container (2) having a dip tube (5), wherein the dip tube (5) is fastened to the inner side of a pipe-shaped lug (6) of the container (2). The dip tube (5) has a removal opening, which can be closed off with a dip tube closure (12). When the dip tube closure (12) is released, a dispense head (4) can be attached to the dip tube (5) for dispensing liquid (3) from the container (2) or for supplying liquid (3) into the container (2), The dip tube (5) has a release safeguard, which abuts the outer side of the pipe-shaped lug (6) with clamping pressure.

DETAILED DESCRIPTION

The invention seeks to solve the problem of providing a dispensing system of the type mentioned at the outset that has augmented functionality and functional safety.

The features of claim 1 are provided to solve this problem. Advantageous embodiments and useful further developments of the invention are described in the dependent claims.

The invention relates to a dispensing system for a container having a dip tube, wherein the dip tube is fastened to the inner side of a pipe-shaped lug of the container. The dip tube has a dispensing opening, which can be closed off with a dip tube closure. When the dip tube closure is released, a dispense head can be attached to the dip tube for dispensing liquid from the container or for supplying liquid into the container. The dip tube has a release safeguard, which abuts the outer side of the pipe-shaped lug with clamping pressure.

An advantageous effect of the release safeguard of the dip tube consists in that with the release safeguard, a more secure holding of the dip tube in the pipe-shaped lug of the container is achieved. Thereby the dip tube is safeguarded against an uncontrolled release from the pipe-shaped lug of the container, particularly also when forces act on the connection between the pipe-shaped lug and dip tube due to opening the dip tube closure.

In principle, the dip tube can be brought into a fastening position in the pipe-shaped lug of the container by a sliding movement.

It is particularly advantageous for the dip tube to be fastened in the pipe-shaped lug by a screw connection. In this case, the dip tube has an outer thread that can be screwed into a corresponding inner thread in the pipe-shaped lug of the container.

In this case, the release safeguard forms a safeguard against rotational opening, which prevents an uncontrolled release of the screw connection. This is achieved, in particular, when a dip tube closure is screwed into the opening on the top of the dip tube while the dispense head is removed from the dip tube. Even if the dip tube closure is screwed into the dip tube with excessive torque, the safeguard against rotational opening effects a safeguard against an uncontrolled release of the dip tube from the pipe-shaped lug of the container when the dip tube closure is screwed off again.

In general, the containers of the dispensing system can consist of electrically non-conductive materials.

According to an especially advantageous embodiment, the release safeguard forms a conductive connection between the dip tube, which consists of dissipation-capable material, and the outer side of the container, which outer side consists of dissipation-capable material.

This further augments the functionality of the dispensing system according to the invention, since with the release safeguard of the dip tube, not only the holding of the dip tube in the pipe-shaped lug of the container is improved.

A second advantageous effect of the release safeguard of the dip tube further consists in that with it, a dissipation of electrostatic charges of the liquid stored in the container is effected.

To prevent such electrostatic charges, a container in a generally known manner has a multilayer wall with an outer layer consisting of dissipation-capable material and an inner layer consisting of an electrically insulating material.

In this context, the dissipation-capable material is a plastic or a metallic material.

Furthermore, the inner layer consist of a plastic.

The dip tube itself also consists of a dissipation-capable material and is mounted in the container in an electrically insulated manner.

According to the invention, electrostatic charges are dissipated via the release safeguard, i.e., outside on the container, in that when the dip tube is fastened to the container, the release safeguard effects a conductive connection with the outer side of the container, which outer side consists of a dissipation-capable material. Therefore, even highly flammable liquids can be safely stored in the container.

According to an embodiment that is advantageous from a design perspective, the dip tube has a dip tube head located inside the pipe-shaped lug. A mushroom-shaped lug is provided on the dip tube head, the side wall of said mushroom-shaped lug lying opposite the outer side of the pipe-shaped lug.

It is advantageous for the dip tube head to be rotationally symmetrical. On its top, the dip tube head has a widening, on the bottom of which the hollow-cylindrical side wall opens out.

In this context, the hollow-cylindrical side wall is oriented coaxial to the axis of symmetry of the dip tube head, wherein the side wall is oriented parallel to the jacket surface of the dip tube head.

Advantageously, engagement elements consisting of a dissipation-capable material are provided on the inner side of the side wall, said engagement elements being engaged with the outer side of the pipe-shaped lug.

Through the engagement of the engagement elements with the outer side of the pipe-shaped lug, on the one hand, a conductive connection of the dip tube to the outer side of the container is realized, and on the other hand, the release safeguard is realized.

According to a first variant, the engagement elements are formed from elastic elements fastened to the inner side of the side wall.

Advantageously, the elastic elements consist of rubber or generally from an elastically deformable plastic. The elastic elements are pressed against the outer side of the pipe-shaped lug with clamping pressure and are deformed thereby, such that a conductive connection between the pipe-shaped lug and the dip tube is realized. Furthermore, the connection between the dip tube and the pipe-shaped lug is secured by the clamping pressure of the elastic elements.

According to a second variant, the engagement elements are formed from hook-shaped elements opening out on the inner side of the side wall.

Advantageously, the hook-shaped elements are springy elements.

These engagement elements are also guided against the outer side of the pipe-shaped lug with clamping pressure and, on the one hand, ensure a conductive connection to the outer side of the container, and on the other hand, effect a securing of the connection between the dip tube and pipe-shaped lug.

It is especially advantageous for the outer contour of the pipe-shaped lug to be adapted to the contours of the hook-shaped elements.

In particular, the hook-shaped elements are in the shape of wings that engage in a non-evenly formed outer contour of the pipe-shaped lug, such that only movements in the screw-on direction of the dip tube in the pipe-shaped lug are possible, i.e., the engagement elements form a rotational safeguard that holds the dip tube securely in the pipe-shaped lug.

According to an advantageous embodiment, a seal is fastened on the bottom of the widening of the dip tube head, which seal is engaged with the top of the pipe-shaped lug.

The seal consists of electrically insulating material.

An electrically insulated mounting of the dip tube in the pipe-shaped lug is achieved thereby.

BRIEF DESCRIPTION OF THE DRAWINGS

The invention is explained in the following with reference to the drawings. They show.

DETAILED DESCRIPTION OF THE PREFERRED EMBODIMENTS

Figure 1:
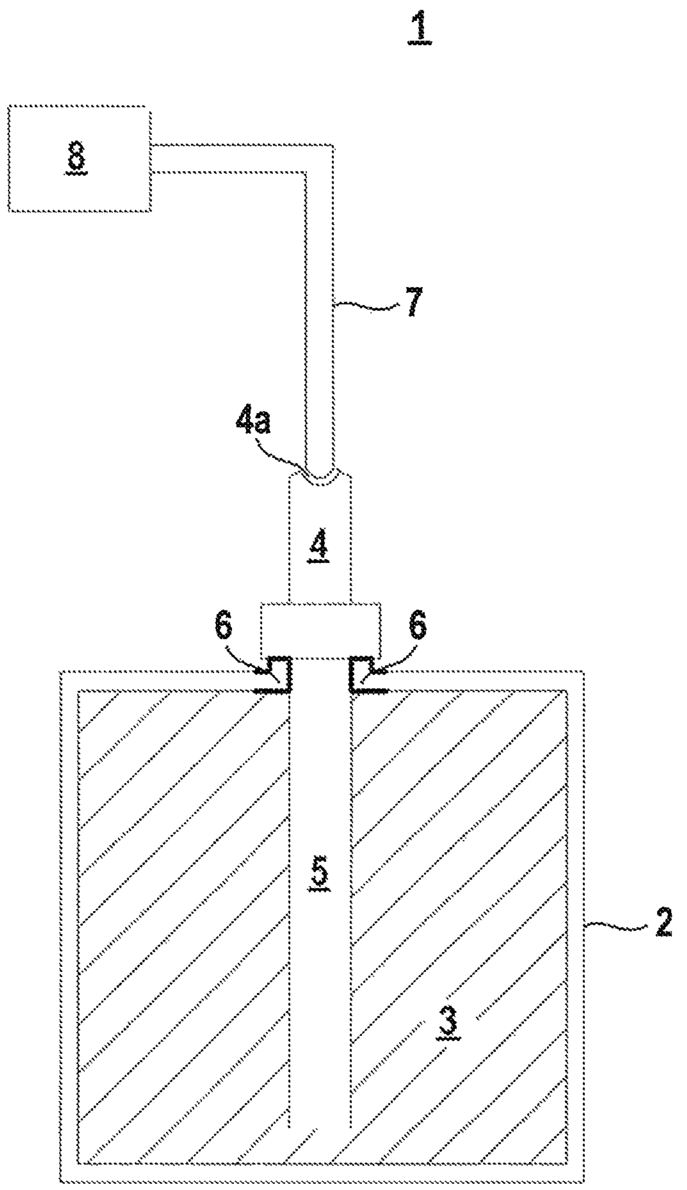
FIG. 1: A schematic depiction of the dispensing system according to the invention.

FIG. 1 shows schematically an exemplary embodiment of the dispensing system 1 according to the invention for transportable containers 2, which in particular can be barrels or similar. A liquid 3 is stored in the respective container 2. The liquids 3 stored in such containers 2 are, in particular, special chemicals in liquid form that can be, in particular, highly flammable.

The dispensing system 1 comprises a dispense head 4, which can be fastened to a dip tube 5. The dip tube 5 is mounted in a pipe-shaped lug 6 of the container 2, which can constitute a bung head, in particular. The longitudinal axis of the dip tube 5 extends in the vertical direction.

The dispense head 4 is used for dispensing liquids 3 from the container 2. The dispense head 4 can also be used for filling containers 2. For this purpose, the extraction head 4 has a liquid connection **4*a* at its upper end. A line 7 that leads to a pump 8 is connected to this fluid connection 4*a*. The line 7 can be constituted in the form of a hose. The pump 8** is controlled by a control unit (not shown).

Figure 2:
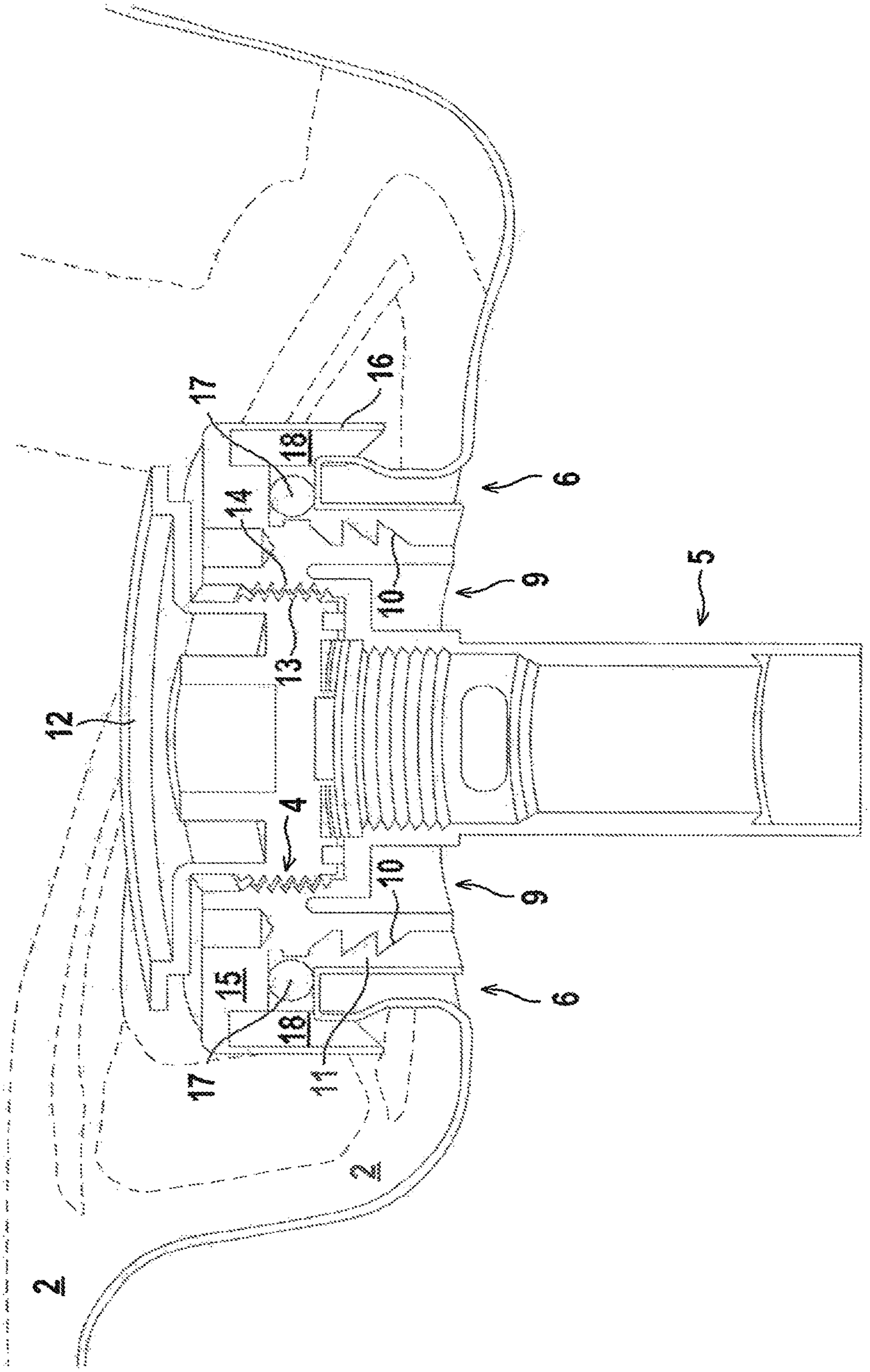
FIG. 2: A partial depiction of a dip tube mounted in a pipe-shaped lug of the container of the dispensing system.
Figure 3:
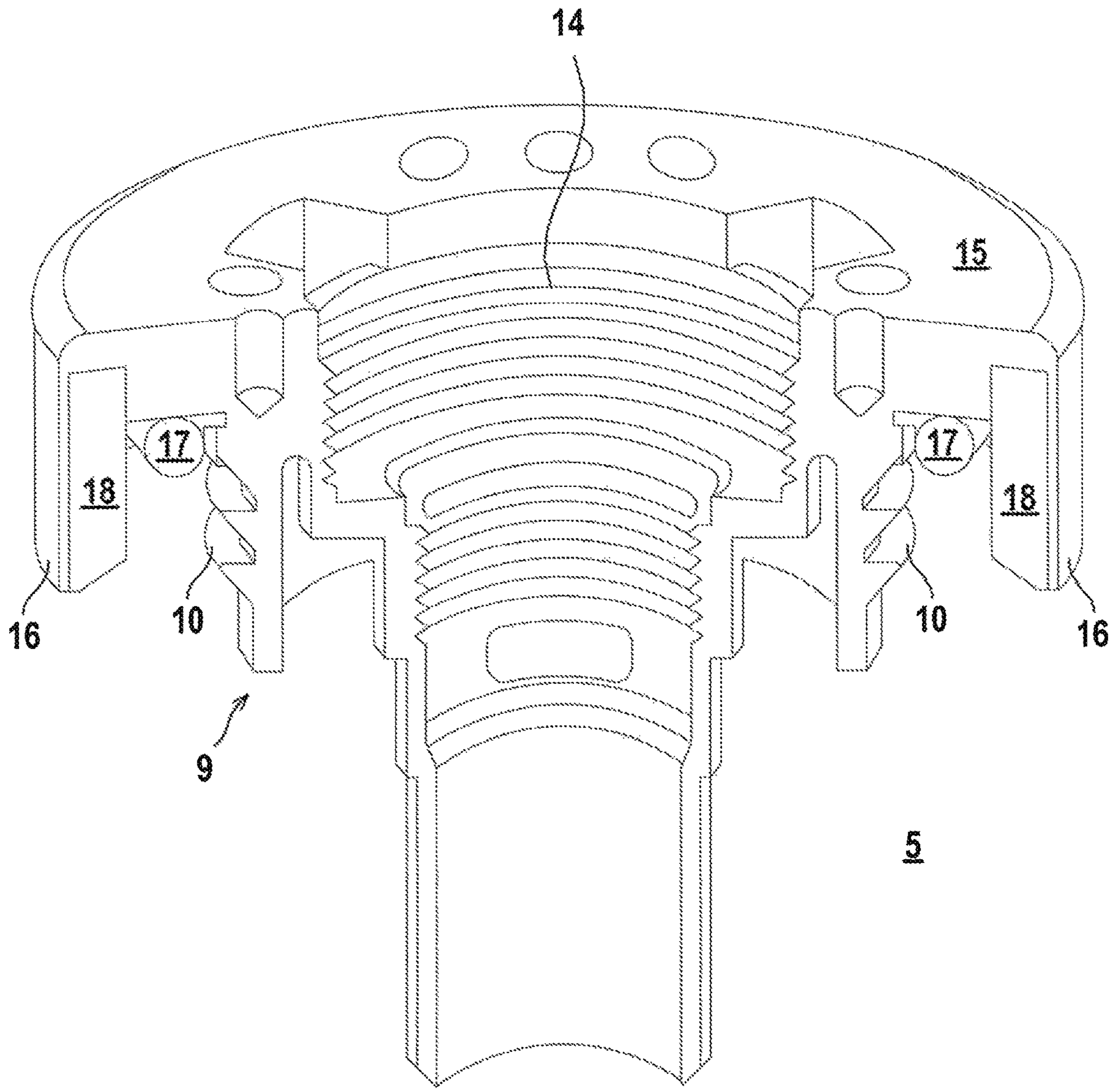
FIG. 3: An individual illustration of the dip tube according to FIG. 2.
Figure 4:
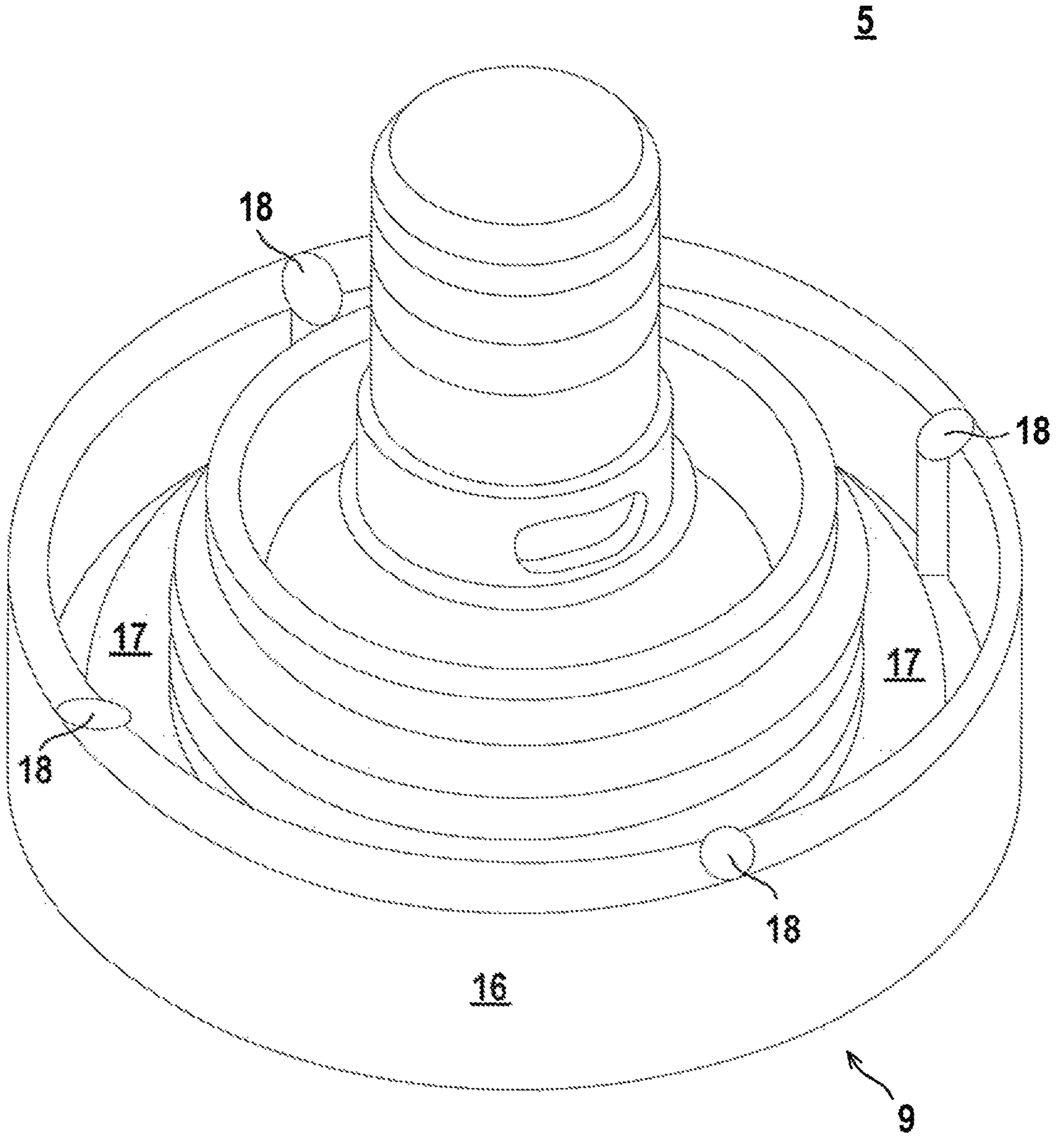
FIG. 4: A top-down view onto the bottom of the dip tube head of the dip tube according to FIG. 3.

FIG. 2 shows an example of the dip tube 5, according to the invention, of the dispensing system 1, which dip tube 5 is mounted in the pipe-shaped lug 6 of the container 2. FIG. 3 shows the upper section of the dip tube 5 with a dip tube head 9 in an individual depiction. FIG. 4 shows a top-down view onto the bottom of the dip tube head 9 of the dip tube 5.

The dip tube 5 with the dip tube head 9 is designed with rotational symmetry relative to the longitudinal axis of the dip tube head 9. For dissipating electrostatic charges of the liquid 3 in the container 2, this consists of a dissipation-capable material, i.e., a material with low electrical conductivity that is large enough to allow electrostatic charges to be dissipated.

Furthermore, the container 2 has a multilayer wall with an outer layer consisting of dissipation-capable material and an inner layer consisting of an electrically insulating material.

The pipe-shaped lug 6 implemented as one piece with the container body has the same multilayer structure.

In this context, the dissipation-capable material is a plastic or a metallic material.

Furthermore, the inner layer consist of a plastic.

The dip tube 5 is connected to the container 2 by a screw connection. For this purpose, the dip tube head 9 has an outer thread 10 on its outer jacket surface, the outer thread 10 being screwed into an inner thread 11 on the inner side of the pipe-shaped lug 6. Since the outer side of the container 2, and therefore the inner thread 11, is electrically insulated, an electrically insulating connection is created.

FIG. 2 shows the arrangement with container 2 and dip tube 5 mounted in the pipe-shaped lug 6. When the dispense head 4 is removed, the opening on the top of the dip tube 5 is closed with a dip tube closure 12, wherein the dip tube closure 12 has an outer thread 13 that is screwed into a corresponding inner thread 14 of the dip tube 5 bordering the opening.

According to the invention, the dip tube head 9 has a release safeguard that stabilizes the screw connection between the dip tube head 9 and pipe-shaped lug 6, and additionally creates an electrically conductive connection to the outer side of the pipe-shaped lug 6 which outer side consists of dissipation-capable material, whereby electrostatic charges of the liquid 3 can be dissipated.

In the embodiment from FIGS. 2 to 4, the release safeguard is constituted such that a mushroom-shaped lug attaches to the dip tube head 9, which mushroom-shaped lug is formed by a circular widening 15 opening out on the top of the dip tube head 9 and a side wall 16 opening out on the bottom of the widening 15.

The widening 15 and the side wall 16 are formed as one piece with the dip tube head 9 and consist of dissipation-capable material. The plane of the widening 15 is oriented perpendicular to the longitudinal axis of the dip tube 5. The side wall 16 of the mushroom-shaped lug is hollow-cylindrical and arranged concentric to the longitudinal axis of the dip tube 5. The side wall 16 extends at a constant distance from the outer material surface of the dip tube head 9.

A circumferential seal 17 running in the circumferential direction of the dip tube head 9 is provided on the bottom of the widening 15. This circumferential seal 17 abuts the top of the pipe-shaped lug 6 with clamping pressure and thus seals the seam between the dip tube head 9 and pipe-shaped lug 6 of the container 2. The seal 17 consists of electrically insulating material, i.e., an electrically insulating connection between the pipe-shaped lug 6 and dip tube 5 is also obtained thereby.

Multiple engagement elements, four, in the present case, in the form of elastic elements 18 are fastened on the inner side of the side wall 16. The elastic elements 18 are arranged distributed evenly in the circumferential direction of the dip tube head 9. The elastic elements 18 consist of dissipation-capable material, particularly of rubber or generally of an elastically deformable plastic. The longitudinal axes of the elastic elements 18 run parallel to the longitudinal axis of the dip tube 5. The elastic elements 18 abut the outer side of the pipe-shaped lug 6 with clamping pressure. The screw connection between the dip tube 5 and the pipe-shaped lug 6 is stabilized by the deformation of the elastic elements 18 and the acting clamping pressure, whereby a release safeguard is obtained, in the present case, a safeguard against rotational opening. Even when the dip tube closure 12 is screwed tight in the dip tube 5 with augmented torque, therefore when screwing open the screw connection between the dip tube closure 12 and the dip tube 5, the screw connection between the dip tube 5 and the pipe-shaped lug 6 is not released, such that an uncontrolled escape of fluid 3 at the seam point between the dip tube 5 and pipe-shaped lug 6 is prevented.

Since the elastic elements 18 consist of dissipation-capable material, they effect a conductive connection from the dip tube head 9 to the outer side of the pipe-shaped lug 6, which also consists of dissipation-capable material. Electrostatic charges of the liquid 3 can be dissipated thereby.

Figure 5:
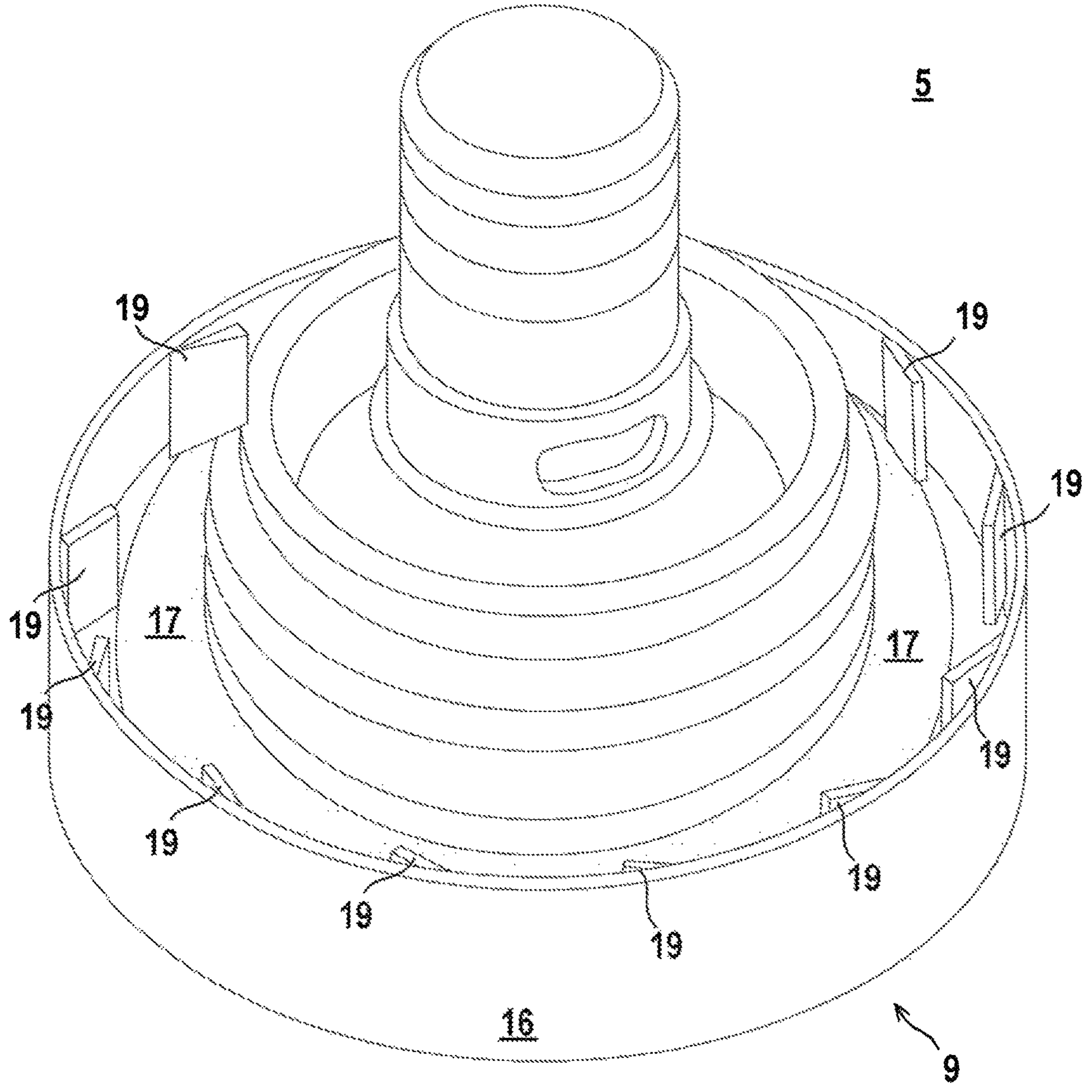
FIG. 5: A variant of the embodiments from FIGS. 3 and 4.

FIG. 5 shows a variant of the embodiment according to FIGS. 2 to 4. This embodiment differs from the embodiments from FIGS. 2 to 4 only in that instead of elastic elements 18, now engagement elements in the form of hook-shaped elements 19 are provided. The hook-shaped elements 19 are implemented as one piece with the dip tube head 9. Due to their low wall strengths, these form springy, wing-shaped elements. The hook-shaped elements 19 consist of dissipation-capable material.

The inner side of the pipe-shaped lug 6 can be formed unevenly and form recesses into which the hook-shaped elements 19 can be latched. Due to the non-symmetrical design of the hook-shaped elements 19, they can only be screwed into the recesses of the pipe-shaped lug 6 in the closure direction of the screw connection between the dip tube head 9 and pipe-shaped lug 6, while conversely the opposite rotational direction is blocked. The hook-shaped elements 19 thus form a safeguard against rotational opening in the form of a rotational safeguard. Since the hook-shaped elements 19 consist of dissipation-capable material and are in contact with the outer side of the pipe-shaped lug 6, electrostatic charges of the liquid 3 are dissipated with them.

LIST OF REFERENCE NUMERALS (1) dispensing system
(2) container
(3) liquid
(4) dispense head
(4*a*) liquid connection
(5) dip tube
(6) pipe-shaped lug
(7) line
(8) pump
(9) dip tube head
(10) outer thread
(11) inner thread
(12) dip tube closure
(13) outer thread
(14) inner thread
(15) widening
(16) side wall
(17) seal
(18) elastic element
(19) hook-shaped element
(20)

What is claimed is:

1. A dispensing system for a container, the dispensing system comprising:

a dip tube, wherein the dip tube is fastened to an inner side of a pipe-shaped lug of the container, wherein the dip tube includes a dispensing opening closeable by a dip tube closure, wherein a dispense head configured to dispense liquid form the container to supply the liquid into the container is attachable to the dip tube when the dip tube closure is removed, wherein the dip tube includes has a release safeguard, which contacts the outer side of the pipe-shaped lug with a clamping pressure, wherein the release safeguard forms a conductive connection between the dip tube which includes dissipation-capable material, and the outer side of the container, which outer side includes dissipation-capable material, wherein the dip tube is mounted in the container in an electrically insulated manner, wherein the release safeguard creates an electrically conductive connection between the dip tube head of the dip tube and the conductive outer side of the container so that electrostatic charges of the liquid in the container are dissipatable, and wherein a dissipation capable material is a material whose electrical conductivity is large enough to allow electric charges to be dissipated, and wherein the dip tube includes an outer thread that is threadable into an inner thread of the pipe-shaped lug, and wherein the release safeguard provides safety against rotational opening of a screw connection between the outer thread of the dip tube and the inner thread of the pipe shaped lug by a friction locking engagement of radially inward protruding engagement elements arranged on a radially inward facing side wall of the dip tube, wherein the radially inward protruding engagement elements are compressed in a radial direction by a contact with a radial outside of the pipe shaped lug and provide the electrically conductive connection between the dip tube and the outer side of the container.

2. The dispensing system according to claim 1, wherein the dip tube includes an inner thread into which the dip tube closure is threadable.

3. The dispensing system according to claim 1, wherein the dip tube includes has a dip tube head mounted in the pipe-shaped lug, and wherein a mushroom-shaped lug attaches to the dip tube head, the side wall of the mushroom-shaped lug lying opposite the outer side of the pipe-shaped lug.

4. The dispensing system according to claim 3, characterized in that the dip tube head is designed with rotational symmetry and has a widening on its top, and the hollow-cylindrically shaped side wall opens out on a bottom of the widening.

5. The dispensing system according to claim 1, wherein the engagement elements are formed by elastic elements fastened on the inner side of the side wall.

6. The dispensing system according to claim 5, wherein the engagement elements are formed by hook-shaped elements protruding from the inner side of the side wall.

7. The dispensing system according to claim 6, wherein the hook-shaped elements are spring elastic.

8. The dispensing system according to claim 6, wherein the outer contour of the pipe-shaped lug is adapted to the contours of the hook-shaped elements.

9. The dispensing system according to claim 8, the hook-shaped elements provide the safety against the rotational opening of the screw connection.

10. The dispensing system according to claim 4, wherein a seal is fastened on the bottom of the widening of the dip tube head, wherein the seal engages a top of the pipe-shaped lug.

11. The dispensing system according to claim 10, wherein the seal is made from electrically insulating material.

12. The dispensing system according to claim 1, wherein the container includes a multilayer wall with an outer layer including dissipation-capable material and an inner layer made from an electrically insulating material.

13. The dispensing system according to claim 1, wherein the dissipation-capable material is a plastic or metallic material.

14. The dispensing system according to claim 1, wherein the inner layer includes consists of a plastic material.

15. The dispensing system according to claim 1, wherein the radially inward protruding engagement elements are integrally configured in one piece with the dip tube.

* * * * *